United States Patent [19]
Yoda et al.

[11] Patent Number: 4,762,612
[45] Date of Patent: Aug. 9, 1988

[54] ANAEROBIC FLUIDIZED BED APPARATUS

[75] Inventors: Motoyuki Yoda, Sagamihara; Mikio Kitagawa, Ayase; Miwako Watanabe, Yamato, all of Japan

[73] Assignee: Kurita Water Industries Ltd., Tokyo, Japan

[21] Appl. No.: 27,773

[22] Filed: Mar. 19, 1987

[30] Foreign Application Priority Data

Mar. 31, 1986 [JP] Japan .................................. 61-74043

[51] Int. Cl.$^4$ .................................................. C02F 3/28
[52] U.S. Cl. .................................................... 210/150
[58] Field of Search ............... 210/617, 618, 661, 150, 210/151, 196, 263, 194

[56] References Cited

U.S. PATENT DOCUMENTS 4,469,599 9/1984 Gros et al. .......................... 210/617
4,482,458 11/1984 Rovel et al. ........................ 210/150

OTHER PUBLICATIONS

Switzenbaum, M. S. et al., "Anaerobic Attached-Film Expanded-Bed Reactor Treatment", Journal WPCF, vol. 52, No. 7, Jul. 1980, pp. 1953–1965.

Primary Examiner—Ivars Cintins
Attorney, Agent, or Firm—Frank J. Jordan; C. Bruce Hamburg; Manabu Kanesaka

[57] ABSTRACT

Disclosed is an anaerobic fluidized bed which comprises a fluidized bed type reaction tank, a bed of fluidized carries in the reaction tank, and means for recycling a part of treated water from the upper portion of the reaction tank to the lower portion of the same. The reaction tank has raw wastewater introduction means at the lower portion, treated water removing means and produced gas exhaust means at the upper portion. The bed is formed by filling in the reaction tank with granular carriers not larger than 300 $\mu$m in diameter and not smaller than 1.1 in specific gravity, and is established so that the ratio h/H of the initial bed height h to the reaction tank effective height H is within a range of from 0.05 to 0.3.

8 Claims, 3 Drawing Sheets

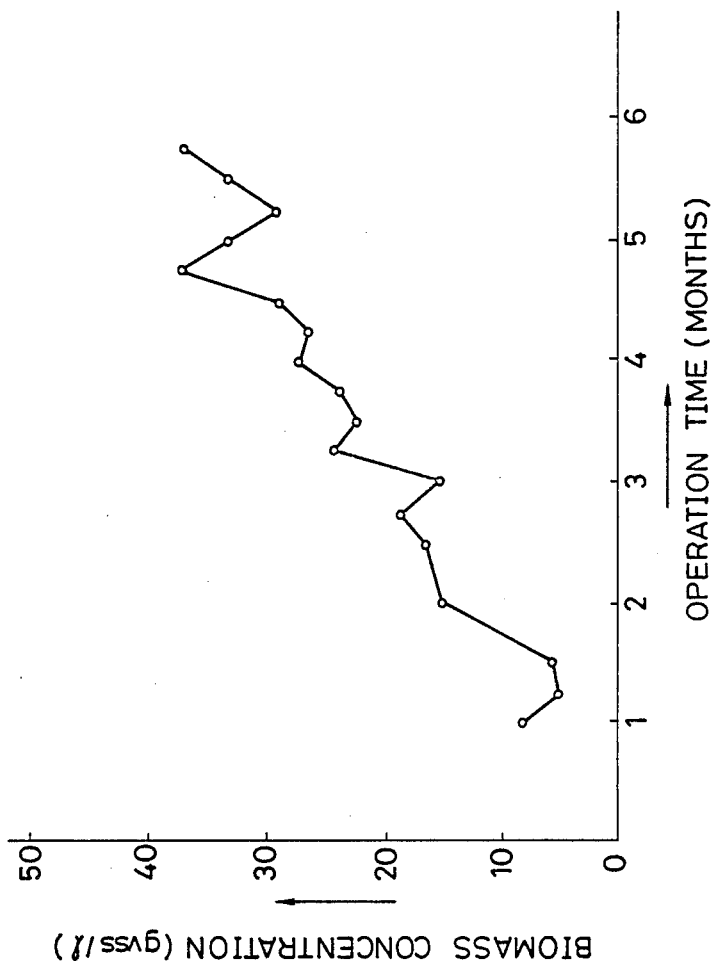

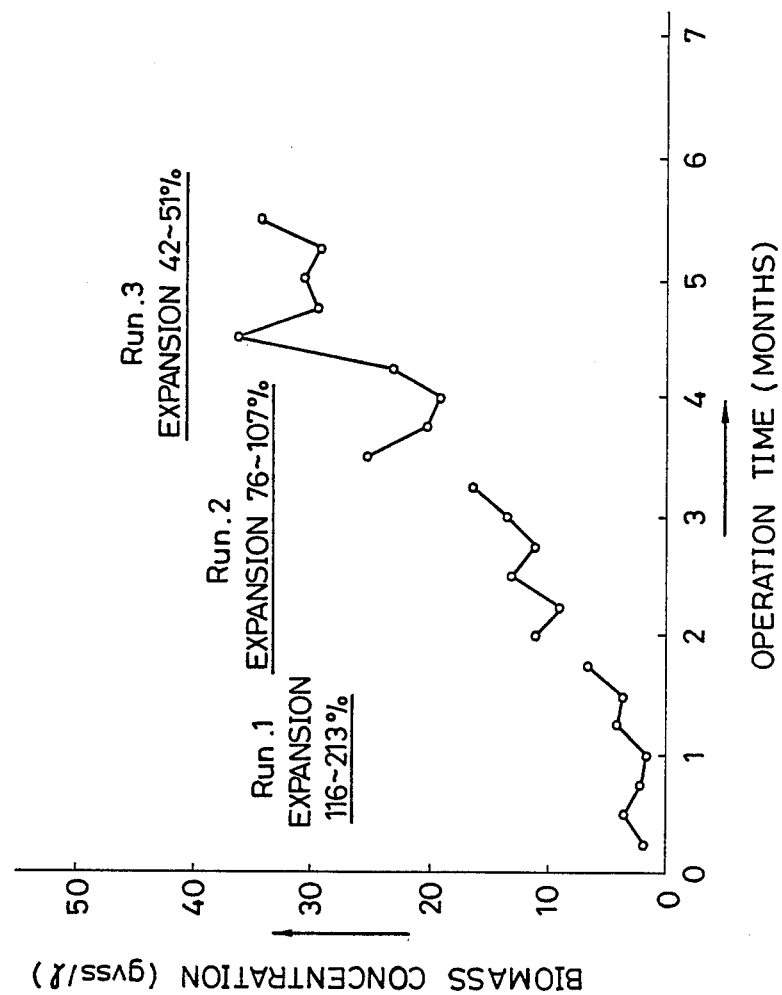

ANAEROBIC FLUIDIZED BED APPARATUS

BACKGROUND OF THE INVENTION

The present invention relates to an anaerobic fluidized bed and, more particularly, relates to an anaerobic fluidized bed using micro carriers and improved to make its start-up extremely easy and fast by utilization of an aggregation phenomenon between the carriers.

Anaerobic fluidized bed has been used as one of apparatus for treating municipal and industrial wastewaters. As well known, carriers in the reaction tank come to be fluidized and be a so-called fluidized bed by introducing raw wastewater into the reaction tank upward. Generally, in order to obtain upflow velocity required for fluidization, a part of treated wastewater is recycled from the upper portion of the reaction tank to the lower portion thereof.

In this type of anaerobic fluidized bed, anaerobic bacteria, exist in the seed materials, such as sewage digester sludge, gradually attach onto the surfaces of the carriers and form biofilms through the pass of organic wastewaters.

Relatively large-sized granular materials have been used as such fluidized carriers.

In this specification, a carrier in a state that organisms have not yet attached thereto is named "nucleus" and a carrier in a state that organisms have attached thereto is named "attached granule".

Microorganisms attached onto a carrier are lower in specific gravity than the carrier (nucleus). Accordingly, as the attachment of microorganisms progresses, the apparent density of the attached granule decreases.

Generally, in the fluidized bed, the increase in diameter of fluidized granules functions as a factor causing the increase of the upflow velocity required for fluidization, and the decrease in specific gravity of fluidized granules functions as a factor causing the decrease of the velocity for fluidization.

In the anaerobic fluidized bed, the decrease in specific gravity of granules due to the attachment of microorganisms dominates the function of increasing the velocity required for fluidization by the increase in diameter of granules. Accordingly, with the progress of the attachment of microorganisms, the bed height of the fluidized bed increases to thereby result in washing-out of carriers (attached granules).

To avoid such washing-out of carriers, conventionally, an operation of reducing upflow velocity has been made with the progress of the attachment of microorganisms to nuclei. Specifically, the measure to prevent washing-out of carriers has been made by either of two kinds of operational methods, one being such that the upflow velocity is gradually reduced with the increase of biofilm thickness to thereby keep the bed height nearly constant and the other being such that the upflow velocity is reduced to a value at a steady state when the bed height reaches a predetermined height.

The former operational method, in which the upflow velocity is gradually reduced, however, has a disadvantage that handling is troublesome because the operation of reducing the upflow velocity should be made on the ground of continuously monitoring the bed height. The latter operational method, in which the upflow velocity is reduced to a value at a steady state when the bed height reaches a predetermined height, also has a disadvantage that the cost of assembling is wastefully great because a sufficiently larger board should be provided at the upper portion of the reaction tank.

Alternatively, there has been proposed a further method of removing biofilms from the carriers having the biofilms excessively attached thereto at the inside or outside of the reaction tank by mechanical means to thereby control biofilm thickness. The method of removing excess biofilms from the carriers by mechanical means has a disadvantage that maintenance is difficult because of the complexity of assebling under extremely corrosive conditions.

SUMMARY OF THE INVENTION

The main object of the present invention is therefore to provide an anaerobic fluidized bed in which efficient biological wastewater treatment can be made with ease and low cost.

Another object of the present invention is to provide an anaerobic fluidized bed in which power requirement for recycle can be reduced, thereby reducing costs for the operation.

A further object of the present invention is to provide an anaerobic fluidized bed which can be operated easily, reduced in size, and maintained easily.

According to the present invention, the anaerobic fluidized bed is arranged to fluidize granular carriers (nuclei) by introduction of raw wastewater or circulation water for the purpose of aggregation of carriers by means of microbial attachment, and comprises: a fluidized bed type reaction tank having raw wastewater introduction means at the bottom, means for removing treated water and produced gas at its upper portion; a media bed in the reaction tank with granular carriers not larger than 300 $\mu$m in diameter and not smaller than 1.1 in specific gravity; and means for recycling a part of the treated water from the upper portion of the reaction tank to the lower portion thereof.

The media bed is established such that the ratio h/H of the initial media bed height h to the effective height H of the reaction tank is within a range of 0.05 to 0.3.

In the anaerobic fluidized bed according to the present invention, the fluidization of the nuclei is carried out with passing raw wastewater through the reaction tank which has been filled with the carriers (nuclei). Although filmy microorganisms are attached to the surfaces of the nuclei with the passage of time, each biofilm is attached and grows to pack two or more granules therein to thereby produce aggregation between carriers. Furthermore, new biofilm is attached to the aggregated carriers and totally greatly grows to thereby produce large-sized aggregation between carriers. Consequently, the biofilms packing carriers therein grow into granular sludge or spherical pellets.

The pellets produced by such aggregation have the same fluidized velocity as that of a nucleus. Accordingly, the pellets are maintained in a fluidity state with an appropriate bed expansion without the necessity of adjusting the upflow velocity substantially.

In short, in the present invention, the decrease in fluidizing velocity due to the decrease of specific gravity caused by the attachment of microorganisms is almost canceled out by the increase in fluidizing velocity due to the increase of diameter caused by the aggregation between carriers. Accordingly, it is possible that high biomass concentrations are maintained without the substantial adjustment of the upflow velocity.

BRIEF DESCRIPTION OF THE DRAWINGS

FIGS. 2 and 3 are graphs showing the results of measurement in examples.

DETAILED DESCRIPTION OF THE PREFERRED EMBODIMENTS

Figure 1:
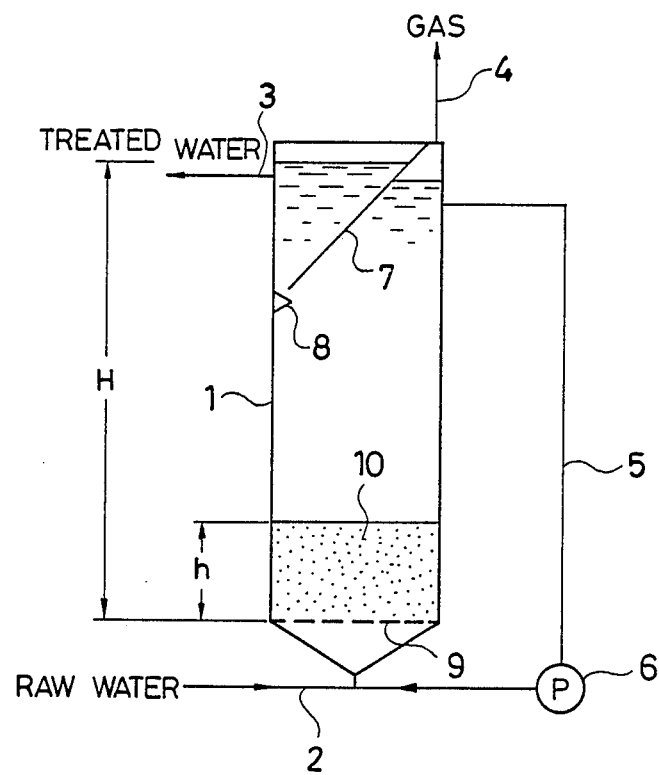
FIG. 1 is a schematic sectional view illustrating an embodiment of an anaerobic fluidized bed in accordance with the present invention.

Referring now to the drawings, particularly to FIG. 1, a reaction tank 1 is provided with a raw wastewater introduction pipe 2 at its lower portion and a treated water removing pipe 3 and a gas exhaust pipe 4 at its upper portion. A piping 5 is provided to recycle a part of treated water to the lower portion of the reaction tank. A pump 6 is placed in the middle of the piping 5.

Although the drawing shows the case where the piping 5 is connected to the raw water introduction pipe 2 to form a T shape, the present invention is applicable to the case where the piping 5 is directly connected to the lower portion of the reaction tank 1.

An oblique partition plate 7 is placed at an upper place within the reaction tank 1 so that the upper end thereof is connected to the top plate of the tank and that the lower end functions as a free side to form a chamber for gas collection. A guide member 8 is fixed to the internal wall of the reaction tank 1 so as to be placed under the lower end of the partition plate 7.

At the lower portion within the reaction tank 1, a dispersion plate 9 is horizontally transversely arranged and carriers 10 are placed thereon. Although the drawing shows the case where the dispersion plate 9 is provided, the present invention is applicable to the case where the dispersion plate 9 is not provided. In the case where the dispersion plate 9 is not provided, the piping 5 is directly connected to the lower portion of the reaction tank 1 so as to be open downwards in the middle of the reaction tank 1.

The drawing shows the apparatus in a stop state, and more particularly, in an initial state where organisms have not yet attached on the carriers.

The stational bed height h of the carriers 10 is equal to the initial bed height. In the present invention, the reaction tank 1 is filled with the carriers 10 so that the ratio h/H of the initial bed height h to the effective height H of the reaction tank 1 is within a range of 0.05 to 0.3, preferably from 0.1 to 0.2. If the ratio h/H is less than 0.05, efficient treatment can not be made because of the shortage of carrier materials. If the ratio h/H is larger than 0.3, not only the carriers is easily washed out of the reaction tank 1 when fluidized, but also the aggregation phenomenon does not occur because of too much surface areas for the microbial attachment.

The carriers (nuclei) used as a filler have an average diameter not larger than 300 μm, preferably not larger than 100 μm. If the diameter is larger than 300 μm, aggregation between carriers (granules) hardly occurs. Reversely, fine granules with excessively small-diameter can hardly form an appropriate fluidized bed. Accordingly, it is preferable that the minimum diameter of the carriers is not smaller than 50 μm.

Various materials, such as clinoptilolite, cristobalite, activated carbon, vermiculite, asbestos, diatomaceous earth (kieselguhr, diatomite, or diatomite earth), and the like, can be used as materials for the carriers.

The carriers (nuclei) herein used have the specific gravity not smaller than 1.1. If the specific gravity is smaller than 1.1, the carriers are easily washed out.

The apparatus embodying the present invention is started up with introducing raw wastewater into the reaction tank 1 through the raw wastewater introduction pipe 2. At this time, bed expansion (percentage of the amount when the remainder after subtracting initial bed height from expanded bed height, is divided by initial bed height) is preferably not less than 5% and not more than 100%. If the expansion is less than 5%, the fluidization becomes unstable because of the shortage of upflow velocity, thereby reducing the treatment efficiency. If the expansion is more than 100%, the fluidity becomes too excessive thereby often reducing the rate of microbiol attachment to carriers and accordingly hardly inducing the aggregation phenomenon among the carriers.

When the apparatus is continuously operated under such conditions as above, microorganisms begin to attach to the surfaces of the carriers (nuclei) to thereby cause aggregation among carriers.

As described above, in the present invention, the decrease of fluidizing velocity due to the decrease in the specific gravity of the carriers caused by the attachment of microorganisms is almost canceled out by the increase of fluidizing velocity due to the increase in the diameter caused by the aggregation between carriers. Accordingly, it is possible that high biomass concentrations are maintained without the necessity of adjusting the upflow velocity. Thus, highly efficient anaerobic treatment can be made with the progress of attachment of micro- organisms.

Furthermore, as the result of both the attachment of microorganisms and the aggregation of carriers, spherical pellets having a large settling velocity are securely formed, and thereafter upflow velocity owing to generated gas is produced. Therefore, it is also possible that the fluidity state is maintained only by supply of raw wastewater without recycle of treated water.

In the following, examples are described.

EXAMPLE 1

By use of an apparatus constructed as shown in FIG. 1, the following raw wastewater treatment was made at the temperature of 30° C.

A cylinder-shape reaction tank with the internal diameter of 10 cm and the height of about 80 cm was filled to about 20% of its capacity with natural zeolite (wet specific gravity: 1.98) which has passed through 200 mesh. A continuous operation was made with respect to the raw wastewater using glucose as a main substrate as shown in the following table.

In the operation, liquid within the tank was circulated at an upflow velocity of about 3 m/hr by a monoflex pump to thereby form a fluidized bed at the bed expansion of about 50%.

| Composition of Raw Water | |
|---|---|
| Glocose | 1000 mg/l |
| N | about 50 mg/l |
| P | about 10 mg/l |
| Yeast extract | about 30 mg/l |

As a result, the existence of pellet-like granules was observed with the passage of about two months after start-up. The pellet-like granules grew into pellets having a mean diameter of about 1.6 mm with the passage of five months thereafter. At that time, biomass concentration of the fluidized bed showed a remarkably large value of about 40 g-vss/l. Accordingly, the operation could be made under the high load not smaller than 20 kg/m³ day as a COD loading.

In this example, biomass concentration changed with the passage of time as shown in FIG. 3. Operational conditions with the passage of from four months to six months after start-up are shown in Table 1.

TABLE 1

Operational Conditions with the Passage of from Four to Six Months after Start-up (Glucose substrate)

| | |
|---|---|
| Volumetric loading*[1] (kg-COD/m³ day) | 20.5 |
| Biomass concentration (gvss/l) | 32.5 |
| Raw water COD (mg/l) | 1200 |
| Treated water COD (mg/l) | 206 (117)*[2] |
| Treated water SS (mg/l) | 67.5 |

*[1]HRT = 1.5 hours
*[2]The value in ( ) shows the COD of dissolved components.

EXAMPLE 2

By use of the same apparatus and the same carrier material as used in Example 1, the treatment of raw wastewater containing about 2000 mg - COD/l of volatile fatty acids (acetic acid: propionic acid: butyric acid=7:1: 2) was carried out. In the treatment, the flow velocity was varied to thereby change bed expansion to three stages as shown in Table 2. The change of biomass concentration in each case is shown in FIG. 3, and attrition rate constant is shown in Table 2.

TABLE 2

| Run | Expansion (%) | Upflow velocity LV (m/hr) | Attrition rate constant* (g/g/day) |
|---|---|---|---|
| 1 | 116–213 | 4.6–5.7 | 0.081 |
| 2 | 76–107 | 3.4 | 0.024 |
| 3 | 42–51 | 2.3 | 0.004 |

*Washout biomass per day (g-VSS/day), total biomass amount (g-VSS)

It was apparent from FIG. 3 and Table 2 that Run 1 with the bed expansion of about 100–200% resulted in a large attrition and low biomass concentration of about 0.5% but that Run 2 with the bed expansion reduced to about 70–100% resulted in formation of 1–3 mm diameter pellets and gradual increase of biomass concentration. Furthermore, Run 3 with the bed expansion reduced to about 40–60% resulted in increase of pellets in the biomass and large biomass concentration of 2.6–3%. As the biomass concentration increased, the amount of generated methane gas rapidly increased.

Operational conditions in Run 3 were shown in Table 3.

TABLE 3

Operational Conditions in Run 3 (Volatile fatty acid substrate)

| | |
|---|---|
| Volumetric loading (kg-COD/m³ day) | 26.1 |
| Biomass concentration (gvss/l) | 26.4 |
| Raw wastewater COD (mg/l) | 2400 |
| Treated water COD (mg/l) | 30 |
| Treated water SS (mg/l) | 17 |

TABLE 3-continued

Operational Conditions in Run 3 (Volatile fatty acid substrate)

It is apparent from the foregoing examples that, according to the present invention, high concentration biomass can be achieved with maintaining the carriers in an appropriate fluidization state to thereby perform high efficient biological treatment. Furthermore, it is possible to reduce both power consumption for recycle and running cost. In addition, a large free board portion is not required, and accordingly, the volumetric capacity of the reaction tank can be maintained at the minimum level.

What is claimed is:

1. An anaerobic fluidized bed apparatus comprising:
a fluidized bed type reaction tank having raw wastewater introduction means provided at a lower portion of said tank, treated water removing means and produced gas exhaust means provided at an upper portion of said reaction tank;
a bed in said reaction tank, said bed comprising granular carriers not larger than 300 μm in diameter and not smaller than 1.1 in specific gravity;
means for recycling a part of treated water from the upper portion of said reaction tank to the lower portion of said reaction tank; and
said bed being established such that a ratio h/H of an initial bed height h to an effective height H of said reaction tank is within a range of from 0.05 to 0.3.

2. An anaerobic fluidized bed apparatus according to claim 1, in which said ratio h/H is within a range of from 0.1 to 0.2.

3. An anaerboic fluidized bed apparatus according to claim 1, in which the diameter of said carriers is not smaller than 50 μm.

4. An anaerobic fluidized bed apparatus according to claim 1, in which the diameter of said carriers is not larger than 100 μm.

5. An anaerboic fluidized bed apparatus according to claim 1, in which said carriers are composed at least of one member selected from the group consisting of clinoptilolite, cristobalite, activated carbon, vermiculite, asbestos, and diatomaceous earth.

6. An anaerobic fluidized bed apparatus comprising:
a reaction tank having upper and lower portions, said reaction tank including raw wastewater introducing means connected to the lower portion of the tank, and treated water removing means connected to the upper portion of the tank,
means for recycling a part of treated water in the tank, said recycling means being situated between the upper and lower portions of the tank, and
granular carriers situated in the tank to form a fluidized bed such that a ratio h/H of an initial bed height h to an effective height H of the reaction tank is within a range between 0.05 and 0.03, said granular carriers having average diameter between 50–300 μm and specific gravity not smaller than 1.1 so that when the anaerobic fluidized bed apparatus is actuated, biofilm is attached to the granular carriers and grows to aggregate together to thereby form spherical pellets, said pellets being maintained in a fluid state without substantially adjusting upflow velocity of the wastewater in the tank.

7. An anaerobic fluidized bed apparatus according to claim 6, further comprising gas exhaust means provided at the upper portion of the tank to exhaust gas formed in the tank.

8. An anaerobic fluidized bed apparatus according to claim 7, further comprising an oblique partition plate situated inside the tank adjacent the exhaust means for introducing gas in the tank to the exhaust means.

* * * * *